United States Patent [19]

Tsai

[11] Patent Number: 5,778,729

[45] Date of Patent: Jul. 14, 1998

[54] BRAKE LEVER ASSEMBLY HAVING AN ADJUSTABLE LEVERAGE

[75] Inventor: Shih Fan Tsai, Chang Hua Hsien, Taiwan

[73] Assignee: Tektro Technology Corporation, Chang Hua, Taiwan

[21] Appl. No.: 659,156

[22] Filed: Jun. 5, 1996

[51] Int. Cl.[6] .............................. B62K 23/06; B62L 3/02

[52] U.S. Cl. .................... 74/489; 74/502.2; 74/502.6; 74/522

[58] Field of Search .................... 74/489, 502.2, 74/502.6, 522, 526

[56] References Cited

U.S. PATENT DOCUMENTS 5,669,268  9/1997  Tsai ............................................. 74/489

*Primary Examiner*—Charles A. Marmor
*Assistant Examiner*—Troy Grabow

[57] ABSTRACT

A brake lever includes a bracket having a shaft disposed in the middle portion. A brake handle has a grip and an arm joined at their proximal ends. The arm includes a lower portion engaged with the shaft and includes a groove and two orifices for engaging with a barrel of a brake cable. One of the orifices is located between the other orifice and the shaft, and moves for a shorter distance than the other orifice when the arm is rotated about the shaft, such that the leverage of the brake lever can be adjusted.

1 Claim, 3 Drawing Sheets

BRAKE LEVER ASSEMBLY HAVING AN ADJUSTABLE LEVERAGE

BACKGROUND OF THE INVENTION

1. Field of the Invention

The present invention relates to a brake lever, and more particularly to a brake lever that may be changed to different leverage.

2. Description of the Prior Art

Typical brake levers are designed for braking purposes. However, the leverage of the brake lever may not be changed. In order to allow leverage adjustment U.S. Pat. No. 5,448,997 to Lumpkin discloses a brake lever having an adjustable bolt for adjusting the leverage of the brake lever. However, normally, only two leverages are required for the brake levers. In addition, the cable link may not be stably retained in place by the bolt. Furthermore, the brake lever includes a complicated configuration that is adverse for manufacturing purposes The present invention has arisen to mitigate and/or obviate the afore-described disadvantages of the conventional brake levers.

SUMMARY OF THE INVENTION

The primary objective of the present invention is to provide a brake lever including a greatly simplified configuration for allowing leverage adjustment.

In accordance with one aspect of the invention, there is provided a brake lever comprising a bracket including a middle having a pivot shaft provided therein, and a brake handle including an elongated finger grip and a transverse elongated mounting arm joined at their proximal ends and integrally formed, the arm including a lower portion engaged with the pivot shaft so as to allow the arm to be rotated about the pivot shaft, the arm including a groove formed therein and including at least one first orifice and at least one second orifice formed therein for engaging with a barrel of a brake cable, the arm including two notches communicating with the orifices for engaging with the brake cable, the second orifice being located between the first orifice and the pivot shaft, and the first orifice moving for a farther distance than the second orifice relative to the bracket when the arm is rotated about the pivot shaft.

Further objectives and advantages of the present invention will become apparent from a careful reading of a detailed description provided hereinbelow, with appropriate reference to accompanying drawings

DETAILED DESCRIPTION OF THE PREFERRED EMBODIMENT

Figure 1:
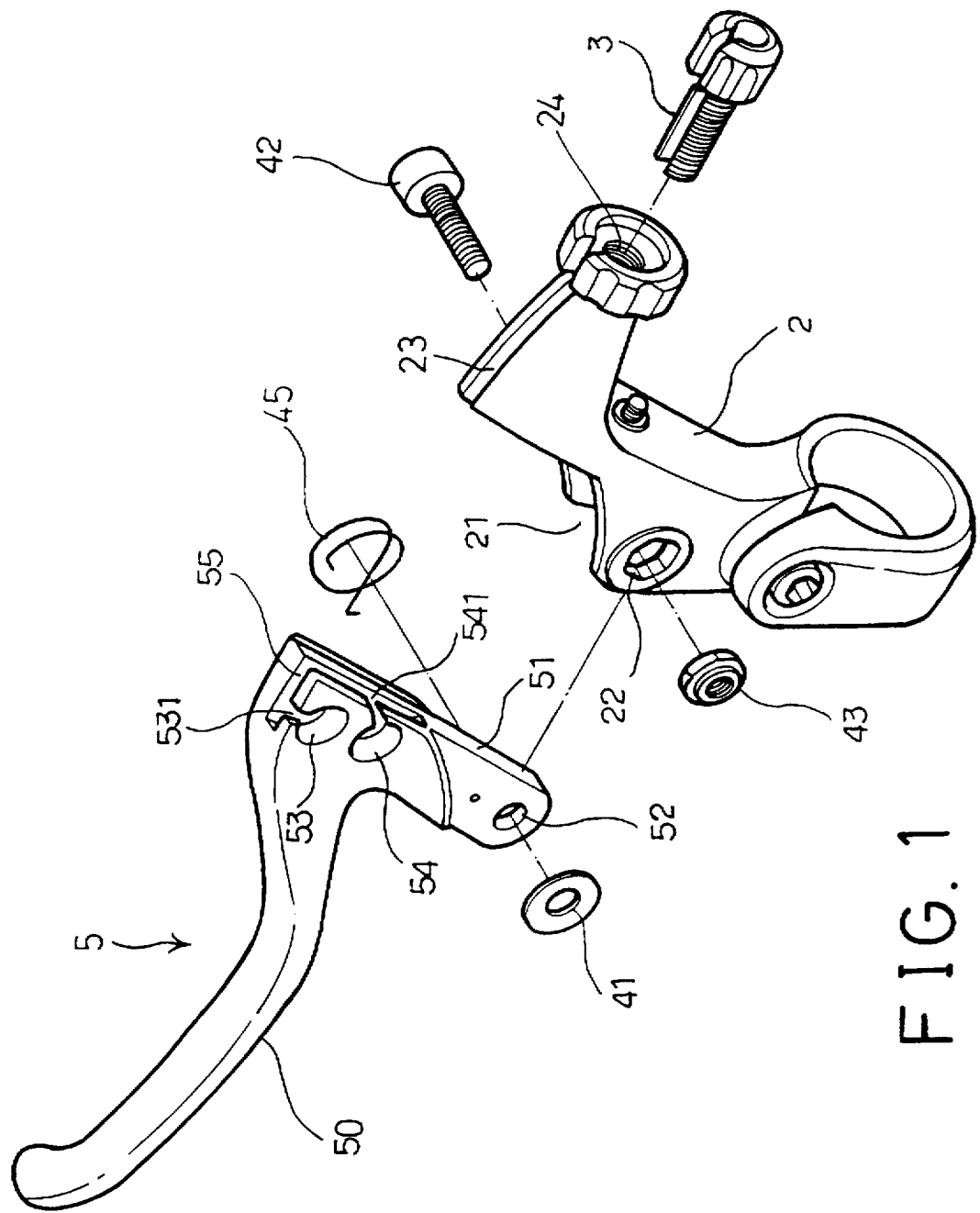
FIG. 1 is an exploded view of a brake lever in accordance with the present invention.
Figure 2:
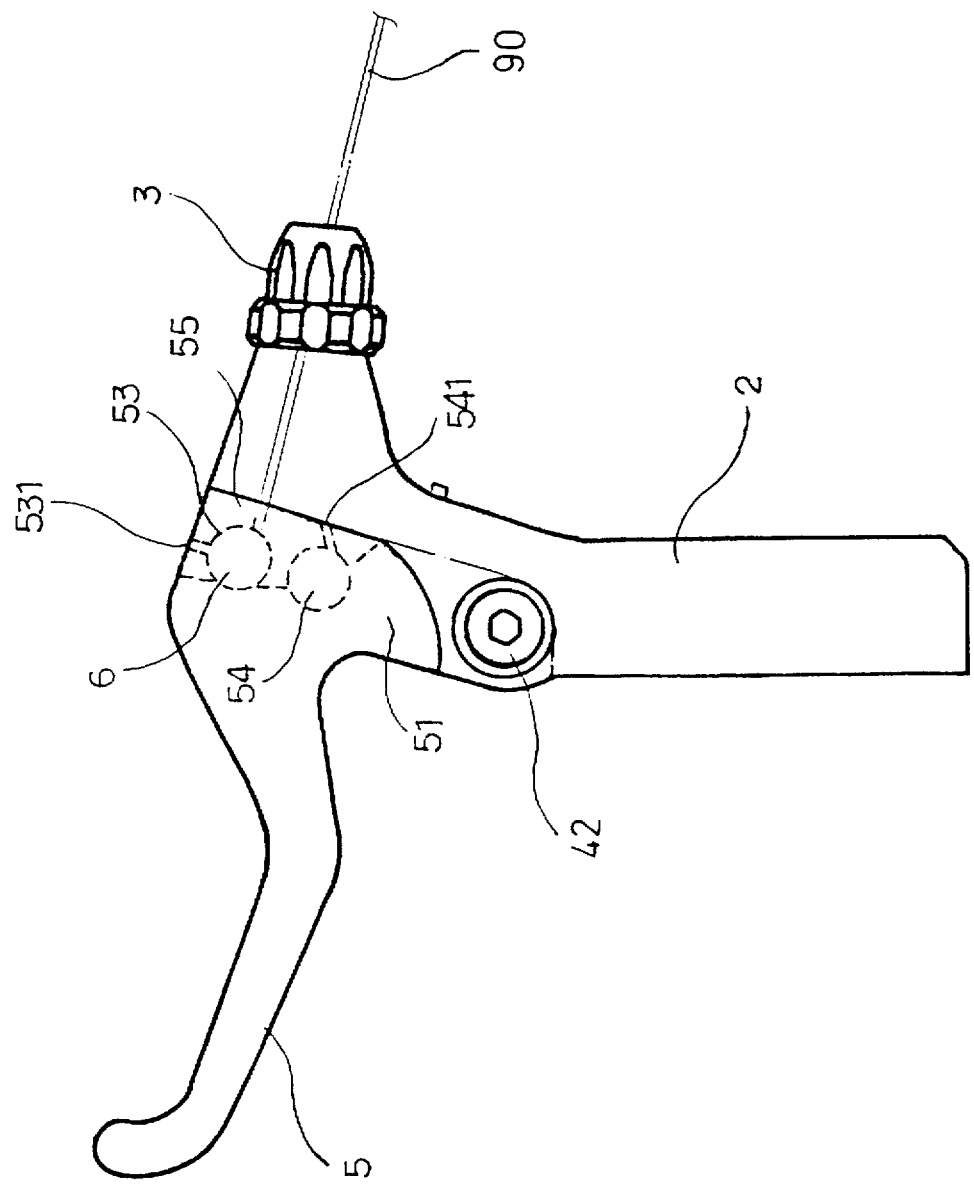
FIG. 2 is a plane view of the brake lever.
Figure 3:
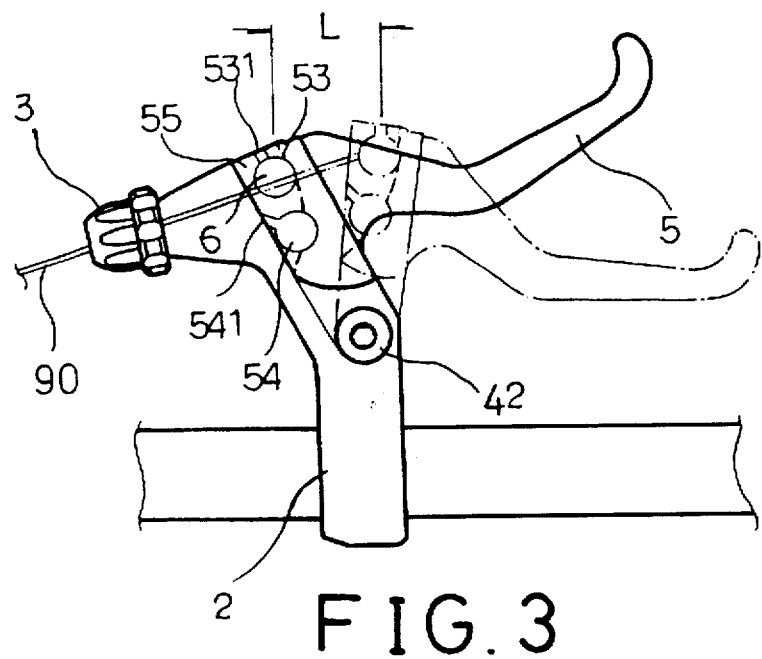
FIGS. 3 and 4 are plane views illustrating the operation of the brake lever.
Figure 4:
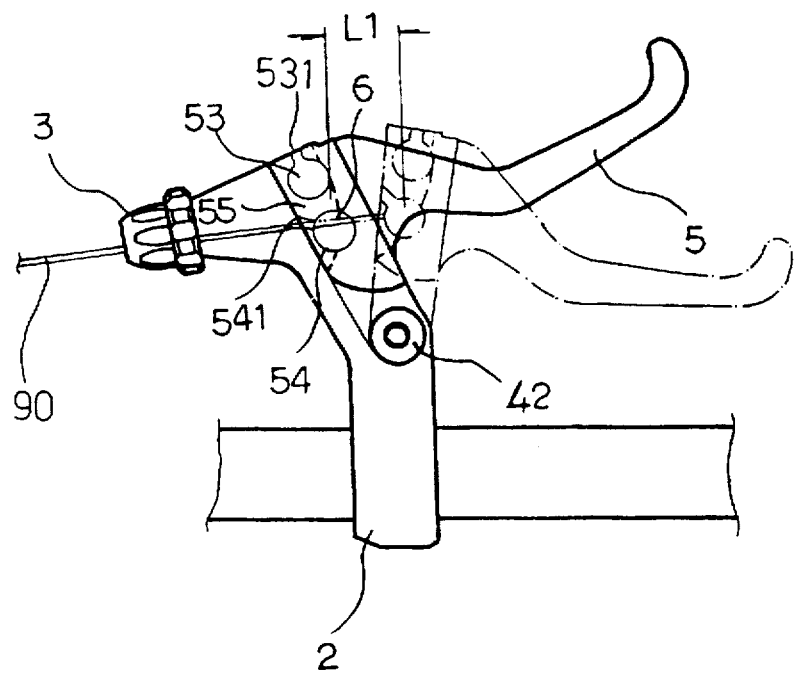

Referring to the drawings, and initially to FIGS. 1 and 2, a brake lever in accordance with the present invention comprises a bracket 2 including an opening 21 formed therein and including a hole 22 formed in the middle port ion for engaging with a pivot shaft or a bolt 42 which is engaged with a nut 43. The bracket 2 includes a slot 23 for engaging with the brake cable 90 (FIGS. 2–4) arid includes a screw hole 24 for engaging with a bolt 3 which may retain the brake cable 90 in place. A brake handle 5 includes an elongated finger grip 50 and a transverse elongated mounting arm 51 joined at their proximal ends and integrally formed. The arm 51 includes a lower portion engaged in the opening 21 of the bracket 2 and includes a hole 52 for engaging with the pivot bolt 42 such that the arm 51 may be rotated about the bolt 42. A washer 41 is engaged on the bolt 42 and engaged between the arm 51 and the bracket 2. The arm 51 includes a groove 55 formed therein for engaging with the brake cable 90 and includes two orifices 53, 54 formed therein for engaging with the cast lug barrel 6 (FIGS. 2–4), and includes two notches 531, 541 communicating with the orifices 53, 54 for engaging with the brake cable and for allowing the barrel 6 to be engaged in the orifices 53, 54. The orifice 54 is located between the pivot bolt 42 and the orifice 53 such that the distance between the orifice 53 and the bolt 42 is greater than that between the other orifice 54 and the bolt 42. A spring 45 is engaged o the bolt 42 and engaged with the arm 51 and the bracket 2 for biasing the arm 51 to engage with the bracket 2.

In operation, when the barrel 6 of the brake cable 90 is engaged in the orifice 5) (FIG. 3), the barrel 6 may be moved for a longer distance L. However, when the barrel 6 of the brake cable 90 is engaged in the other orifice 54 (FIG.4), the barrel 6 may be moved for a shorter distance L1 such that the leverage of the brake lever can be adjusted or changed.

Accordingly, the brake lever includes a brake handle having two orifices for engaging with the barrel and for adjusting the distance between the barrel and the pivot bolt such that the leverage of the brake handle having two orifices for engaging with the barrel includes a greatly simplified configuration that may be easily manufactured. Furthermore,the barrel may be solidly retained in the respective orifices.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake lever comprising:

a bracket including a middle portion having a pivot shaft provided therein, and a brake handle including an elongated finger grip and a transverse elongated mounting arm joined at their proximal ends and integrally formed, said arm including a lower portion engaged with said pivot shaft so as to allow said arm to be rotated about said pivot shaft, said arm including a groove formed therein and including at least one first orifice and at least one second orifice formed therein and spaced from each other for engaging with a barrel of a brake cable, said arm including two notches communicating with said first and said second orifices for engaging with the brake cable and for allowing the barrel to be easily engaged into said notches, said second orifice being located between said first orifice and said pivot shaft, and said first orifice moving a farther distance than said second orifice relative to said bracket when said arm is rotated about said pivot shaft.

* * * * *